Figure 1:

United States Patent [19]

Kubo

[11] 3,928,054
[45] Dec. 23, 1975

[54] PRODUCTS OF WOLLASTONITE CRYSTALS AND MANUFACTURING THE SAME

[75] Inventor: Kazuhiko Kubo, Gifu, Japan

[73] Assignee: Kabushiki Kaisha Osaka Packing Seizosho, Osaka, Japan

[22] Filed: Sept. 4, 1973

[21] Appl. No.: 394,251

[52] U.S. Cl. .................................. 106/120; 106/63
[51] Int. Cl.² ............................................ C04B 1/00
[58] Field of Search ............. 106/120, 288 B, 30 C

[56] References Cited
UNITED STATES PATENTS 3,501,324   3/1970   Kubo .............................. 106/120
3,679,446   7/1972   Kubo .............................. 106/120

Primary Examiner—J. Poer
Attorney, Agent, or Firm—Larson, Taylor and Hinds

[57] ABSTRACT

An agglomerate of wollastonite crystals characterized in that it has a substantially spherical shell construction having a diameter of up to $150\mu$ and comprising a shell and an interior space thereby defined, said shell being made of wollastonite crystals containing at least 50% by weight of $\beta$-wollastonite crystals interlocked with one another three-dimensionally; an aqueous dispersion thereof for preparing a shaped product of wollastonite crystals; and a method for manufacturing shaped products of wollastonite.

9 Claims, 4 Drawing Figures

PRODUCTS OF WOLLASTONITE CRYSTALS AND MANUFACTURING THE SAME

This invention relates to products of wollastonite crystals and the manufacture thereof. More particularly, the invention pertains to novel and useful agglomerates of wollastonite crystals; shaped products composed of the above agglomerates; aqueous dispersion of the agglomerates for preparing the shaped products; and a method for producing these wollastonite products.

As known in the art shaped products composed of wollastonite crystals have excellent properties exhibiting no deterioration at high temperatures of above 1,000°C. Therefore, the products are expected to be useful as thermal insulating materials, refractories, etc., but there has been proposed no useful method for preparing them.

In a known method shaped products of wollastonite crystals are produced by shaping a mixture of natural or synthetic wollastonite crystals and a clay serving as a binder into a desired shape and firing the resultant shaped body. According to the above method it is impossible to obtain lightweight shaped products usable, for example, as thermal insulating materials, and further the firing which has to be conducted after the shaping step in order to obtain a product having sufficient mechanical strength renders the process complicated and impairs the dimensional stability of the final product.

The present invention has previously proposed a method for producing lightweight shaped products of wollastonite crystals which is characterized by firing a lightweight shaped mass of xonotlite crystals to convert the xonotlite crystals to wollastonite crystals. According to this method, however, the firing step essential to the manufacture of the shaped mass of xonotlite crystals renders the method disadvantageous in respect of thermal economy and imposes limitations on the size of the shaped product, especially on its thickness, since difficulties remain in converting xonotlite crystals to wollastonite crystals uniformly throughout the interior of the shaped product of a large size or thickness.

An object of the invention is to provide agglomerates of wollastonite crystals which are easily dispersible in an aqueous medium to produce an aqueous dispersion thereof and which exhibit a specific activity capable of producing a lightweight wollastonite shaped product having sufficient mechanical strength when they are shaped in the presence of water and dried, hence there is no need to use binder or to apply a firing step in the preparation of shaped products.

Another object of the invention is to provide a method for producing agglomerates of wollastonite crystals having the above characteristics.

Another object of the invention is to provide an aqueous dispersion of the agglomerates of wollastonite which can be made into a lightweight wollastonite shaped product having excellent mechanical strength merely by shaping and drying.

Another object of the invention is to provide a method for producing a shaped product of wollastonite crystals which overcomes the foregoing disadvantages in the known methods.

Another object of the invention is to provide a method for producing a shaped product uniformly composed of wollastonite crystals throughout the interior of the product and having excellent mechanical strength with a lightweight property.

Another object of the invention is to provide a method for producing a wollastonite shaped product with an excellent mechanical strength and a high order of dimensional stability.

Another object of the invention is to provide a method for producing a shaped product of wollastonite crystals having any desired shape and accurate dimensions.

Another object of the invention is to provide a method for producing a shaped product of wollastonite crystals which makes it possible to improve the properties thereof using various additives.

These and other objects of the invention will be apparent from the following description.

The agglomerate of wollastonite crystals in the present invention has a substantially spherical shell construction having a diameter of up to $150\beta$ and comprising a shell and an interior space thereby defined, said shell being made of wollastonite crystals containing at least 50% by weight of $\beta$-wollastonite crystals interlocked with one another three-dimensionally.

According to the researches of the present inventor it has been found that the above agglomerates of wollastonite crystals can be readily and uniformly dispersed in an aqueous medium to produce an aqueous dispersion thereof and that the resultant aqueous dispersion can be made into a shaped product having excellent mechanical strength merely by shaping and drying without using any binding material or without following a firing procedure. The resultant shaped product is composed of numerous agglomerates joined with one another. Since each agglomerate constituting the shaped product is low in bulk density, it is possible according to the present invention to produce lightweight shaped products of wollastonite crystals having bulk densities varying over a wide range, among which those having a bulk density of less than 0.45 g/cm$^3$, particularly less than 0.3 g/cm$^3$, are useful as thermal insulating materials. Moreover, the shaped products of wollastonite crystals having various shapes and dimensions can be obtained with a high order of dimensional stability, since firing procedure after shaping step is unnecessary. Furthermore, various additives can be added to the aqueous dispersion of the agglomerates of wollastonite crystals, whereby the properties of the final shaped products obtained therefrom can be improved in accordance with the kind of the additives used.

The agglomerates of wollastonite crystals in the present invention are of a substantially spherical shell construction having a dimeter of up to $150\mu$. If the agglomerates have diameters in excess of $150\mu$, the mechanical strength of the shaped products obtained therefrom will be reduced. Preferable diameters of the agglomerates are in the range of 3 to $150\mu$, the most preferable being in the range of 30 to $90\mu$. The diameters of agglomerates given in the specification and claims are determined through inspection by optical microscope. The shell construction of the present agglomerate is substantially spherical in shape. This is seen from micrographs, for example, from a dark ground micrograph of the agglomerates taken at a magnification of 120 diameters and a scanning electron micrograph of the agglomerates taken at a magnification of 600 diameters. The shell construction comprises a shell and an interior space thereby defined. The shell is composed of wollastonite crystals closely interlocked with one another but has a good water-permeability. The interior of the shell is hollow or has a sparse distribution of wollastonite crystals. This specific structure can be observed from a scanning electron micrograph of a broken agglomerate. Further it is seen from the electron micrograph that the agglomerate has a number of crystals projecting from its surface. The crystals contituting the present agglomerates are wollastonite crystals containing at least 50% by weight of $\beta$-wollastonite crystals, based on the total weight of the wollastonite crystals. It is preferable that the agglomerates consist of only $\beta$-wollastonite crystals, but other form of wollastonite crystals, i.e., $\alpha$-wollastonite crystals, may be contained in an amount of up to 50% by weight, based on the total weight of the wollastonite crystals.

The method for preparing the agglomerates is not critical in this invention. Typically, the agglomerates can be readily prepared from a specific aqueous slurry of xonotlite crystals. Such slurry is disclosed in U.S. Pat. No. 3,679,446. For example, the agglomerates are prepared by drying and subsequently firing the slurry at a temperature of 780° to 1,200°C, preferably 1,000° to 1,100°C to convert the xonotlite crystals. The aqueous slurry of xonotlite crystals is characterized in that needle-like xonotlite crystals are disposed in water in the form of numerous agglomerates. The agglomerates have a substantially spherical shell construction comprising a shell and an interior space thereby defined. The shell is made of xonotlite crystals interlocked with one another three-dimensionally. The aqueous slurry of xonotlite crystals can be prepared, for example, by heating with stirring a starting aqueous slurry of siliceous material and lime under a steam pressure. The amount of the lime relative to the siliceous material is preferably in the molar ratio of CaO : SiO$_2$ of between 0.8 : 1 and 1.3 : 1. The amount of water used in the starting slurry is in such proportion as to produce the aqueous slurry of xonotlite crystals having a weight ratio of solid to water of between 1 : 10 and 1 : 25. The steam pressure applied is preferably in the range of 8 to 50 kg/cm$^2$ and the reaction temperature is the saturated temperature under such steam pressure.

The agglomerates composed of xonotlite crystals can be prepared by drying the aqueous slurry of xonotlite crystals thus obtained. When the dried agglomerates are fired at a temperature of 780° to 1,200°C, preferably 1,000 to 1,100°C, the xonotlite crystals constituting the agglomerates are converted into wollastonite crystals to produce agglomerates of wollastonite crystals. It has been found that during the firing step a substantial change in the structure of the agglomerates does not take place. The form of the wollastonite crystals alters in accordance with the firing temperature and firing time. At a firing temperature of about 780° to 1,110°C, $\beta$-wollastonite crystals are formed selectively, and at 1,200°C or higher, $\alpha$-wollastonite crystals. Temperatures between 1,100°C and 1,200°C give a mixture of $\beta$-wollastonite crystals and $\alpha$-wollastonite crystals at a ratio which varies with the firing time. Therefore, the firing temperature and firing time may be determined suitably in this invention.

The agglomerates of wollastonite crystals can easily be dispersed in an aqueous medium to produce an aqueous dispersion in which numerous agglomerates are dispersed. The aqueous medium to be used is usually water but a mixture of water with water-soluble organic solvents such as methanol can be used. The agglomerates per se exhibit no activity but when dispersed in an aqueous medium the agglomerates are filled up, in their interior spaces, with the aqueous medium penetrating through the water-permeable shell of the agglomerate and display a specific activity. That is to say, a shaped product of wollastonite crystals having excellent mechanical strength can be obtained merely by shaping and drying the resulting aqueous dispersion. This is attributable to the fact that when the resulting aqueous dispersion is shaped under pressure, the agglomerates are joined with one another physically into a shaped mass without being collapsed because the aqueous medium fills up their interior spaces and that when subsequently dried, the shaped mass is dried with the agglomerates joined with one another to produce a shaped product which exhibits a high order of mechanical strength. As the pressure increases in the shaping step, the aqueous medium is progressively removed from agglomerates to give a compressed shaped mass. Thus, the bulk density of the shaped product depends on the pressure applied for shaping. The amount of water to be used is at least such that is required to fill up the spaces in the interior of the agglomerates. Usually, the amount of water is 3 to 25 times, preferably about 10 to 15 times, the total weight of the solid. Simply by molding and drying, the aqueous dispersion can be made into a shaped product of wollastonite crystals that is low in bulk density and has high mechanical strength. The aqueous dispersion need not necessarily be such that all the wollastonite crystals therein form agglomerates of up to 150$\mu$ in diameter, but it may contain some amount of agglomerates greater than 150$\mu$. My researches have shown that if the particulate agglomerates of up to 150$\mu$ account for at least 40% by weight of all the wollastonite crystals in the dispersion, the dispersion gives a lightweight and mechanically strong shaped product whem simply shaped and dried. I have also found that particularly good results are achieved with a dispersion in which agglomerates of up to 150$\mu$ in diameter account for 90 to 100% by weight of all the wollastonite crystals therein. Furthermore, my researches have revealed that if at least 50% by weight of wollastonite crystals forming the agglomerates are $\beta$-wollastonite crystals, it is likewise possible to obtain a mechanically strong shaped product having a low bulk density simply by shaping and drying.

Various reinforcing materials can be added to the aqueous dispersion of this invention to improve the properties of the resultant shaped product. To improve the mechanical strength of the resultant shaped product, for instance, inorganic and/or organic fibers can be used. Examples of the inorganic fibers are asbestos, rock wool, glass fiber, etc. Examplary of the organic fibers are pulp, wood powder, polyamide fiber, polyester fiber, etc. These fibers are used in an amount of about 2 to 25% by weight, preferably about 2 to 15% by weight, based on the total weight of the solids in the dispersion. Further to impart improved heat resistance to the desired shaped product clays such as bentonite, kaolin, pyrophyllite, fire clay, etc. can be added. Usually, these clays are used in amount of about 5 to 100% by weight, preferably about 8 to 30% by weight, based on the total weight of the solids in the dispersion. Furthermore, cements can also be added to the dispersion of this invention in an amount of about 3 to 20% by weight, preferably about 5 to 15% by weight, based on the total weight of the solids in the dispersion, whereby surface hardness and density of the desired shaped product are increased. Only one or at least two of these reinforcing materials may be used.

In preparing a shaped product from the aqueous dispersion of this invention, the dispersion is first shaped into a desired shape such as a block, pipe, plate, column and the like desired shape and dried to substantially remove uncombined water. For shaping, various shaping methods are applicable, but filter molding may preferably be employed. The filter molding comprises placing the present dispersion in a female mold having a desired form and a plurality of small holes and pressing the dispersion by a male mold to remove excess water until a self-supporting mass is formed. Further in case of a dispersion containing pulp, the dispersion is formed into a sheet, which is then pressed into a shaped product in sheet for by means of a paper making machine and dried to obtain a finished product. Drying can be done at atmospheric pressure and temperature, but a reduced pressure can be applied to accelerate drying.

The shaped product thus obtained is characterized by a specific structure comprising agglomerates joined with one another and compressed in the direction of pressure applied for shaping. Namely, the agglomerates in the present shaped product are compressed more or less in at least one direction due to the pressure applied in the shaping step. Since the agglomerates in themselves are of considerable strength, they will not be completely crushed unless subjected to an exceedingly great shaping pressure. In general, the bulk density of the shaped product chiefly depends upon the pressure applied for shaping, that is to say, a low shaping pressure results in a lower bulk density and a high shaping pressure in a greater bulk density. Therefore, a shaped product having a low density is composed of agglomerates which are compressed but not crushed. In fact, when the broken surface of a shaped product having a low bulk density is magnified and observed through an optical microscope or scanning electron microscope, the agglomerates are found to form the shaped product as they are interlocked with one another. This can also be ascertained by inspecting a transmission photograph showing a thin section of the shaped product and taken at right angles with the pressing direction at the time of shaping. Shaped products having a low bulk density of up to 0.45 g/cm³ have sufficient mechanical strength and excellent heat-insulating property and are therefore useful as a heat-insulating material. With a shaped product in accordance with the present invention having a high bulk density it may be difficult to identify the agglomerates in a magnified photograph or transmission photograph. When diffracted by X-ray, however, such shaped product exhibits peculiar orientation, showing that the agglomerates forming the shaped product are compressed strongly in the direction of pressure applied in the shaping step.

The features of this invention will be made apparent from the examples given below, in which all parts are by weight.

Example 1

To 1,200 parts of water was added 49 parts of quick lime for slaking, and to the resultant solution of slaked lime was added with stirring 51 parts of siliceous sand passing through a 325-mesh screen and containing 97 % by weight of $SiO_2$, whereby a starting aqueous slurry containing slaked lime and siliceous sand was obtained. The slurry was placed in an autoclave and heated with stirring at 191° to 198°C under a steam pressure of 12 to 14 kg/cm² gauge for 4 hours, whereby an aqueous slurry containing numerous agglomerates composed of xonotlite crystals was obtained. By X-ray diffraction the crystals were found to be xonotlite crystals. A dark ground micrograph of the resultant slurry taken at a magnification of 120 diameters and an electron micrograph taken at a magnification of 13,000 diameters show that the slurry thus obtained contained numerous agglomerates dispersed in the water and the agglomerates, substantially spherical in shape, had a diameter of 40 to 150$\mu$ and were made of needle-like xonotlite crystals interlocked with one another three-dimensionally.

The resulting slurry was then dried to obtain dried agglomerates of xonotlite crystals. The dried agglomerates were fired in an electric furnace at 1,000° ± 10°C for 3 hours, whereby xonotlite crystals were converted into $\beta$-wollastonite crystals to produce agglomerates of $\beta$-wollastonite crystals. During the firing step there were observed substantially no collapse and shrinkage of the agglomerates. By X-ray diffraction the resultant agglomerates were confirmed to be composed of $\beta$-wollastonite crystals.

Figure 2:
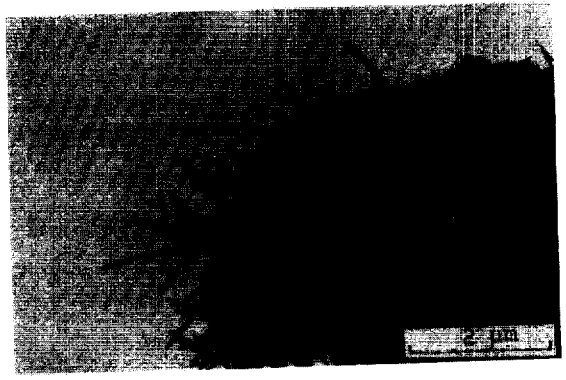
Figure 3:
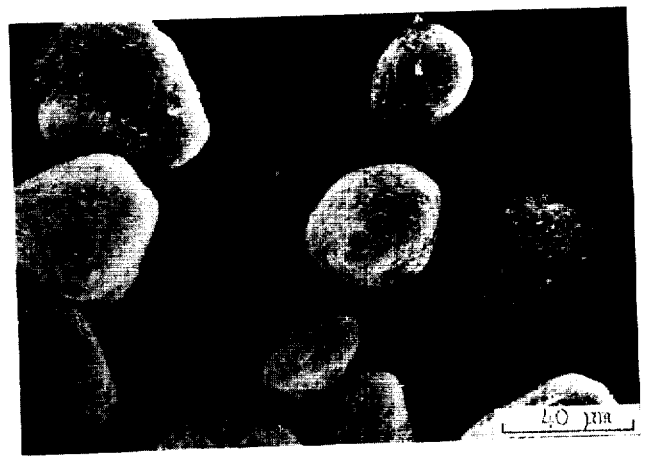
Figure 4:

The micrographs of the agglomerates are shown in FIGS. 1 to 4 attached hereto, in which:

FIG. 1 shows a dark ground micrograph thereof taken at a magnification of 120 diameters, FIG. 2 shows an electron micrograph thereof taken at a magnification of 13,000 diameters, FIG. 3 shows a scanning electron micrograph thereof taken at a magnification of 600 diameters, and FIG. 4 shows a scanning electron micrograph of broken agglomerate taken at a magnification of 1,000 diameters.

It is evident from the above micrographs that the agglomerates thus obtained are in a substantially spherical shell construction having a diameter of 10 to 150$\mu$. Particularly, FIGS. 3 and 4 show each agglomerate has a substantially spherical shell construction comprising a shell and an interior space thereby defined and closely resembling the husk of a chestnut. The shell is made of needle-like $\beta$-wollastonite crystals closely interlocked with one another three-dimensionally.

The agglomerates of $\beta$-wollastonite crystals thus obtained were dispersed in water together with additives shown in Table 1 below to produce aqueous dispersions containing numerous agglomerates dispersed therein. The amount of water used was 10 times the total weight of the solids contained therein.

Table 1

| Sample No. | Clay | Additives (wt.%)* Asbestos | Glass fiber | Cement |
|---|---|---|---|---|
| 1 | Bentonite 17 | 7 | — | — |
| 2 | Kaoline 10 | 5 | — | — |
| 3 | Kaoline 10 | 5 | — | — |
| 4 | Bentonite 10 | — | 5 | 2 |
| 5 | Bentonite 10 | — | 5 | 2 |

Note:
*The amount of additives added is shown in weight percent, based on the total weight of the solids.

The dispersion thus obtained was placed into a female mold having numerous holes and pressed by a male mold to produce a shaped mass. The shaped mass was removed from the mold and dried in an air oven at 190°C.

A scanning electron micrograph of the broken surface of the dried product shows that the product was formed of a number of agglomerates joined with one another.

The mechanical strength and heat resistance of the products are shown in Table 2 below.

Table 2

| Sample No. | After preparation | | After 3 hrs' firing* | |
|---|---|---|---|---|
| | Bulk density (g/cm³) | Bending strength (kg/cm²) | Coefficient of linear contraction (%) | Bending strength (kg/cm²) |
| 1 | 0.18 | 4.0 | 0.2 | 4.3 |
| 2 | 0.20 | 6.3 | 0.1 | 6.8 |
| 3 | 0.54 | 34.5 | 0.4 | 37.8 |
| 4 | 0.20 | 7.5 | 0.0 | 3.7 |
| 5 | 0.37 | 23.1 | 0.3 | 17.0 |

Note:
*The properties after firing are those of Sample Nos. 1 to 3 fired at 1050°C for 3 hours and those of Sample Nos. 4 to 5 fired at 1000°C for 3 hours.

Example 2

The dried agglomerates of xonotlite crystals obtained in the same manner as in Example 1 were fired at 1150° ± 10°C for 3 hours. By X-ray diffraction the resulting agglomerates were found to be composed of a predominant amount of β-wollastonite and a minor amount of α-wollastonite. The same results as in FIGS. 1 to 4 were observed from a dark ground micrograph, electron micrograph and scanning electron micrograph of the agglomerates.

The agglomerates thus obtained were dispersed in water, to which additives shown in Table 3 below were added. The resultant dispersions were shaped and dried in the same manner as in Example 1 to produce shaped products having physical properties shown in Table 3 below.

Table 3

| Sample No. | Additives (wt.%)*¹ | | After preparation | | After firing*² | |
|---|---|---|---|---|---|---|
| | Bentonite | Asbestos | Bulk density (g/cm³) | Bending strength (kg/cm²) | Coefficient of linear contraction (%) | Bending strength (kg/cm²) |
| 6 | 10 | 7 | 0.32 | 3.6 | 0.1 | 4.5 |
| 7 | 17 | 7 | 0.53 | 14.3 | 0.5 | 21.7 |

Note:
*¹The amount of additives is by weight percent based on the total weight of the solids.
*²The properties after firing are those of the products fired at 1,100°C for 3 hours.

Example 3

To 560 parts of water was added 47 parts of quick lime for slaking, and to the resultant solution of slaked lime was added 53 parts of siliceous material dispersed in 320 parts of water. The siliceous material used was a byproduct obtained in producing metal silicon and containing amorphous silicic acid as a main component with $SiO_2$ content of 92% by weight, the average particle size thereof being $0.2\mu$. The mixture was diluted with 1,520 parts of water and the resulting aqueous slurry was placed in an autoclave and heated with stirring at 191°C under a steam pressure of 12 kg/cm² for 8 hours. This gave an aqueous slurry containing numerous agglomerates measuring 3 to $30\mu$ in diameter and composed of xonotlite crystals interlocked with one another three-dimensionally.

The resulting slurry was dried to obtain dried agglomerates. The dried agglomerates were then heated at 1,000°C for 3 hours, whereby agglomerates of β-wollastonite crystals were obtained. The same results as in Example 1 were observed from a dark ground micrograph electron micrograph and scanning electron micrograph of the agglomerates.

The agglomerates thus obtained were dispersed in water, to which additives shown in Table 4 below were added. The resultant dispersions were shaped and dried in the same manner as in Example 1 to produce shaped products having physical properties shown in Table 4 below.

Table 4

| Sample No. | Additives (wt.%)*¹ | | | After preparation | | After firing*² | |
|---|---|---|---|---|---|---|---|
| | Bentonite | Glass fiber | Cement | Bulk density (g/cm³) | Bending strength (kg/cm²) | Coefficient of linear contraction % | Bending strength (kg/cm²) |
| 8 | — | 6 | 3 | 0.19 | 3.8 | 0.2 | 3.6 |
| 9 | 10 | 3 | 2 | 0.19 | 6.0 | 0.08 | 5.1 |
| 10 | 10 | 3 | 2 | 0.37 | 15.0 | 0.17 | 18.2 |

Note:
*¹The amount of additives is by weight percent, based on the total weight of the solids.
*²The properties after firing are those of the products fired at 1,000°C for 3 hours.

What is claimed is:
1. A method for manufacturing a shaped product of wollastonite crystals comprising the steps of;
1. dispersing agglomerates of wollastonite crystals into water to produce a dispersion of agglomerates of wollastonite crystals, said agglomerates of wollastonite crystals having a substantially spherical shell construction which has a diameter of up to $150\mu$ and comprises a shell and interior space thereby defined, said shell being made of wollastonite crystals containing at least 50% by weight of

β-wollastonite crystals interlocked with one another three-dimensionally,
2. shaping the resulting dispersion of agglomerates of wollastonite crystals into desired shape, and then,
3. drying the resulting shape to produce a shaped product of wollastonite crystals.

2. The method for manufacturing a shaped product of wollastonite crystals according to claim 1, wherein said agglomerate has a diameter of 3 to 150μ.

3. The method for manufacturing a shaped product of wollastonite crystals according to claim 2, wherein said diameter is in the range of 30 to 90μ.

4. The method for manufacturing a shaped product of wollastonite crystals according to claim 1, wherein said wollastonite crystals are only β-wollastonite crystals.

5. The method for manufacturing a shaped product of wollastonite crystals according to claim 1, wherein said dispersion of agglomerates of wollastonite crystals contains water in an amount of 3 to 25 times the total weight of the solid.

6. The method for manufacturing a shaped product of wollastonite crystals according to claim 5, wherein said amount of water is in the range of 10 to 15 times the total weight of the solid.

7. The method for manufacturing a shaped product of wollastonite crystals according to claim 1, wherein said dispersion of wollastonite crystals further contains at least one reinforcing material.

8. The method for manufacturing a shaped product of wollastonite crystals according to claim 7, wherein said reinforcing material is at least one of inorganic and organic fibers.

9. The method for manufacturing a shaped product of wollastonite crystals according to claim 7, wherein said reinforcing material is at least one of clay.

* * * * *